United States Patent
Kim et al.

(10) Patent No.: US 9,494,819 B2
(45) Date of Patent: Nov. 15, 2016

(54) LIQUID CRYSTAL DISPLAY PANEL, LIQUID CRYSTAL DISPLAY DEVICE, AND RELATED MANUFACTURING METHOD

(71) Applicant: Samsung Display Co., Ltd., Yongin, Gyeonggi-Do (KR)

(72) Inventors: Youngmin Kim, Yongin-si (KR); Jae Byung Park, Seoul (KR); Mun-Ki Sim, Seoul (KR); Sumi Lee, Hwaseong-si (KR)

(73) Assignee: SAMSUNG DISPLAY CO., LTD. (KR)

(*) Notice: Subject to any disclaimer, the term of this patent is extended or adjusted under 35 U.S.C. 154(b) by 197 days.

(21) Appl. No.: 14/276,371

(22) Filed: May 13, 2014

(65) Prior Publication Data
US 2015/0070614 A1 Mar. 12, 2015

(30) Foreign Application Priority Data
Sep. 11, 2013 (KR) .................. 10-2013-0109205

(51) Int. Cl.
*G02F 1/1335* (2006.01)
*G02B 5/30* (2006.01)
*G02F 1/1368* (2006.01)

(52) U.S. Cl.
CPC ....... *G02F 1/133536* (2013.01); *G02F 1/1368* (2013.01); *G02F 1/133514* (2013.01)

(58) Field of Classification Search
None
See application file for complete search history.

(56) References Cited

U.S. PATENT DOCUMENTS

| | | |
|---|---|---|
| 6,665,034 B2 | 12/2003 | Suzuki |
| 7,744,289 B2 | 6/2010 | Hu |
| 7,965,357 B2 * | 6/2011 | Van De Witte ... G02F 1/133555 349/114 |
| 8,049,841 B2 * | 11/2011 | Sugita .................. G02B 5/3058 349/113 |
| 8,232,718 B2 | 7/2012 | Cok et al. |
| 2007/0141244 A1 | 6/2007 | Bell et al. |
| 2009/0153781 A1 * | 6/2009 | Otani .................. G02B 5/3016 349/74 |
| 2010/0002173 A1 * | 1/2010 | Otani ................ G02F 1/133555 349/114 |
| 2012/0280259 A1 | 11/2012 | Hatta et al. |
| 2014/0028956 A1 * | 1/2014 | Choi ................. G02F 1/133528 349/96 |

FOREIGN PATENT DOCUMENTS

| | | |
|---|---|---|
| JP | 2004-093825 | 3/2004 |
| KR | 10-2005-0067801 | 7/2005 |
| KR | 10-2012-0066516 | 6/2012 |

OTHER PUBLICATIONS

"Chromonic liquid crystals: properties and applications as functional materials," Chemical Communications, The Royal Society of Chemistry, Issue 17, 2008, pp. 1957-1967, by Suk-Wah Tam-Chang and Liming Huang.*
Bae et al., A novel thin film polarizer from photocurable non-aqueous lyotropic chromonic liquid crystal solutions, Journal of Materials Chemistry, 2011, 21, 2074-2077.

* cited by examiner

*Primary Examiner* — Ryan Crockett
(74) *Attorney, Agent, or Firm* — Innovation Counsel LLP

(57) ABSTRACT

A liquid crystal display panel includes two base substrates disposed spaced apart from each other, a pixel, and at least one polarizer. The liquid crystal display panel includes a transmitting area and a light blocking area disposed adjacent to the transmitting area. The polarizer includes a reflection part overlapped with the light blocking area and a polarization part overlapped with the transmitting area. The polarization part includes lyotropic chromonic liquid crystal dye molecules aligned in a predetermined direction.

16 Claims, 11 Drawing Sheets

LIQUID CRYSTAL DISPLAY PANEL, LIQUID CRYSTAL DISPLAY DEVICE, AND RELATED MANUFACTURING METHOD

CROSS-REFERENCE TO RELATED APPLICATION

This U.S. non-provisional patent application claims priority under 35 U.S.C. §119 to and benefit of Korean Patent Application No. 10-2013-0109205, filed on Sep. 11, 2013, which is incorporated herein by reference in its entirety.

BACKGROUND

1. Field of the Invention

The present invention is related to a liquid crystal display panel, a method for manufacturing the liquid crystal display panel, and a liquid crystal display device that includes the liquid crystal display panel.

2. Description of the Related Art

A liquid crystal display device typically includes a liquid crystal display panel and a backlight unit. The liquid crystal display panel may display an image using light provided from the backlight unit.

The liquid crystal display panel may include two substrates and a liquid crystal layer disposed between the two substrates. Two polarizing films may be disposed on the two substrates, respectively. The light provided to the liquid crystal display panel from the backlight unit may be transmitted through or reflected by the liquid crystal display panel in accordance with an arrangement of liquid crystal molecules of the liquid crystal layer.

SUMMARY

Embodiments of the present invention may be related to display panel (e.g., a liquid crystal display panel) that has substantially satisfactory light efficiency, has a substantially large size, and/or is manufactured at a substantially low cost. Embodiments of the present invention may be related to a display device that includes the display panel. Embodiments of the present invention may be related to a method for manufacturing the display panel.

Embodiments of the invention may be related to a display panel (e.g., a liquid crystal display panel) that may include a transistor (e.g., a thin film transistor). The display panel may further include a reflection part that overlaps the transistor in a first direction. The display panel may further include a polarization pattern that overlaps the reflection part in a second direction. The second direction may be perpendicular to the first direction. The polarization pattern may include molecules that are oriented according to a predetermined orientation direction.

The reflection part may completely cover a control electrode of the transistor in the first direction.

The display panel may include an insulation layer disposed between the reflection part and the transistor. The insulation layer may directly contact each of the reflection part and a control electrode of the transistor.

The display panel may include a first base substrate that overlaps the reflection part in the first direction. The first direction may be perpendicular to a surface (e.g., bottom surface) of the first base substrate. The second direction may be parallel to the surface of the first base substrate.

The display panel may include a polarizer that overlaps the polarization pattern in the first direction.

The polarizer may include a polarization part and a plurality of stretched-element polarizing films. The polarization part may be disposed between at least two of the stretched-element polarizing films and may overlap the reflection part.

A thickness of at least one of the stretched-element polarizing films may be unequal to a thickness of the polarization part. An optical axis direction of the at least one of the stretched-element polarizing films may be identical to an optical axis direction of the polarization part.

The display panel may include a pixel electrode that overlaps the polarization part and overlaps the polarization pattern.

The display panel may include a light alignment layer that overlaps at least one of the reflection part and the polarization pattern. The predetermined orientation direction may be parallel to a molecular axis of the light alignment layer.

A portion of the light alignment layer may be disposed between the reflection part and the polarization pattern.

The display panel may include a black matrix that overlaps the reflection part in the first direction.

The molecules in the polarization pattern may comprise bis-(N,N diethylaminoethyl)perylene-3,4,9,10-tetracarboxylic diimide (PDI-DEAE).

Embodiments of the invention may be related to a display device that may include the following elements: a transistor; a reflection part overlapping the transistor in a first direction; a polarization pattern overlapping the reflection part in a second direction that is perpendicular to the first direction, the polarization pattern including molecules oriented according to a predetermined orientation direction; and a light unit overlapping each of the reflection part and the polarization pattern and configured to provide light.

The display device may include a polarizer. Each of the reflection part and the polarization pattern may be disposed between the light unit and the polarizer.

The polarizer may include a polarization part and a plurality of stretched-element polarizing films. The polarization part may be disposed between at least two of the stretched-element polarizing films and may overlap the reflection part.

The polarization pattern may include a polarization part and a plurality of stretched-element polarizing films. The polarization part may be disposed between at least two of the stretched-element polarizing films Embodiments of the invention may be related to a method for manufacturing a display panel (e.g., a liquid crystal display panel). The method may include the following steps: forming a reflection part; forming a polarization pattern that overlaps the reflection part in a first direction, the polarization pattern including molecules oriented according to a predetermined orientation direction; and forming a transistor that overlaps the reflection part in a second direction that is perpendicular to the first direction.

The method may include the following steps: forming a polymer layer that overlaps and contacts the reflection part; and applying a polarized light to the polymer layer for forming a light alignment layer.

The step of forming the polarization pattern may include the following steps: forming a material layer on the light alignment layer using a mixture solution that includes molecules dissolved in a solvent and a light curing agent, wherein a first portion of the material layer overlaps the reflection part, wherein a second portion of the material layer is disposed between two portions of the reflection part; applying a curing light to the material layer to at least partially cure the second portion of the material layer; and removing the first portion of the material layer.

The method may include the following step: partially removing the second portion of the material layer to form the polarization pattern, such that a thickness of the polarization pattern is less than a thickness of the material layer.

The step of forming the polarization pattern may include the following steps: providing a mixture solution that includes molecules dissolved in a solvent and a light curing agent; applying a shear force to the mixture solution to form a material layer, such that a first portion of the material layer overlaps the reflection part and that a second portion of the material layer is disposed between two portions of the reflection part; applying a light to the material layer to at least partially cure the second portion of the material layer; and removing the first portion of the material layer.

Embodiments of the invention may be related to a liquid crystal display panel that may include a first base substrate, a second base substrate, a pixel, a first polarizer, and a second polarizer. The liquid crystal display panel includes a transmitting area and a light blocking area disposed adjacent to the transmitting area.

The first base substrate and the second base substrate are disposed spaced apart from each other, and the pixel is disposed between the first base substrate and the second base substrate. The first and second polarizers are spaced apart from each other, such that the pixel is disposed between the first and second polarizers.

The first polarizer includes a reflection part that overlaps the light blocking area and includes a polarization part that overlaps the transmitting area. The polarization part includes lyotropic chromonic liquid crystal dye molecules aligned in a predetermined direction.

The first polarizer receives a light provided from a backlight unit earlier than the second polarizer. The first polarizer is disposed between a surface of the first base substrate and the pixel.

The reflection part includes a metal layer disposed on the surface of the first base substrate.

The polarization part includes a light alignment layer disposed on the surface of the first base substrate and includes a polarizing pattern including the lyotropic chromonic liquid crystal dye molecules aligned by the light alignment layer.

The lyotropic chromonic liquid crystal dye molecules include bis-(N,N diethylaminoethyl)perylene-3,4,9,10-tetracarboxylic diimide (PDI-DEAE).

Embodiments of the invention may be related to a method for manufacturing a liquid crystal display panel. The method may include the following steps: forming a reflection part on a surface of a base substrate including a transmitting area and a light blocking area adjacent to the transmitting area, the reflection part overlapping the light blocking area; and forming a polarization part containing lyotropic chromonic liquid crystal dye molecules aligned in a predetermined direction on the surface of the base substrate, the polarization part overlapping the transmitting area, and forming a pixel on the surface of the base substrate to overlap with the transmitting area.

The forming of the polarization part may include the following steps: forming a light alignment layer having an alignment axis in the predetermined axis on the surface of the base substrate; coating a mixture solution containing the lyotropic chromonic liquid crystal dye molecules, a light curing agent, and a crosslink agent on the light alignment layer to form a coating layer; irradiating a light to the coating layer from the other surface of the base substrate to partially cure the coating layer; and removing a portion of the coating layer that is not substantially cured.

The forming of the polarization part may include shear-coating a mixture solution containing the lyotropic chromonic liquid crystal dye molecules, a light curing agent, and a crosslink agent on the surface of the base substrate to form a coating layer; irradiating a light to the coating layer from the other surface of the base substrate to partially cure the coating layer; and removing a portion of the coating layer that is not substantially cured.

Embodiments of the invention may be related to a liquid crystal display device that may include a liquid crystal display panel, a backlight unit, a first polarizer, and a second polarizer. The liquid crystal display panel may include a first base substrate, a second base substrate spaced apart from the first base substrate, and a plurality of pixels disposed between the first base substrate and the second base substrate. The liquid crystal display panel may include a plurality of transmitting areas and a light blocking area disposed adjacent to the transmitting areas when viewed in a plan view.

The first polarizer includes a plurality of stretched-element polarizing films, a plurality of polarization parts, and a reflection part. Each of the stretched-element polarizing films may overlap a portion of the transmitting areas.

The polarization parts may overlap the other portion of the transmitting areas, which is not overlapped with the polarizing films. The polarization parts contain lyotropic chromonic liquid crystal dye molecules aligned in a predetermined direction. The reflection part is overlapped with a portion of the light blocking area, which is disposed adjacent to the transmitting areas not overlapped with the polarizing films.

The stretched-element polarizing films have an optical axis in the same direction as an optical direction of the polarization part.

According to embodiments of the invention, the reflection part may reflect light provided from the backlight unit without substantially absorbing the light. The reflected light is re-reflected by the optical elements (e.g., optical films) included in the backlight unit, and then is incident to the liquid crystal display panel. Therefore, an amount of the light incident to the liquid crystal display panel may be maximized, and thus the light efficiency of the liquid crystal display panel may be maximized.

The stretched-element polarizing films of the first polarizer and the polarization part may have the same optical axis direction. Although the liquid crystal display panel may not include a large-sized stretched-element polarizing film, the liquid crystal display panel may display images with satisfactory quality. With small-sized polarizing films, the manufacturing cost of the liquid crystal display panel may be minimized.

The reflection part may function as a mask in the manufacturing process of the polarization part. The portion of the coating layer that overlaps the reflection part may not receive light, and the portion of the coating layer that does not overlap the reflection part may receive substantial light. Therefore, the coating layer is partially cured, and the cured portion may form the polarization part. The time and cost for manufacturing the liquid crystal display panel may be minimized since the coating layer is patterned without using an additional mask.

DETAILED DESCRIPTION

Figure 1:
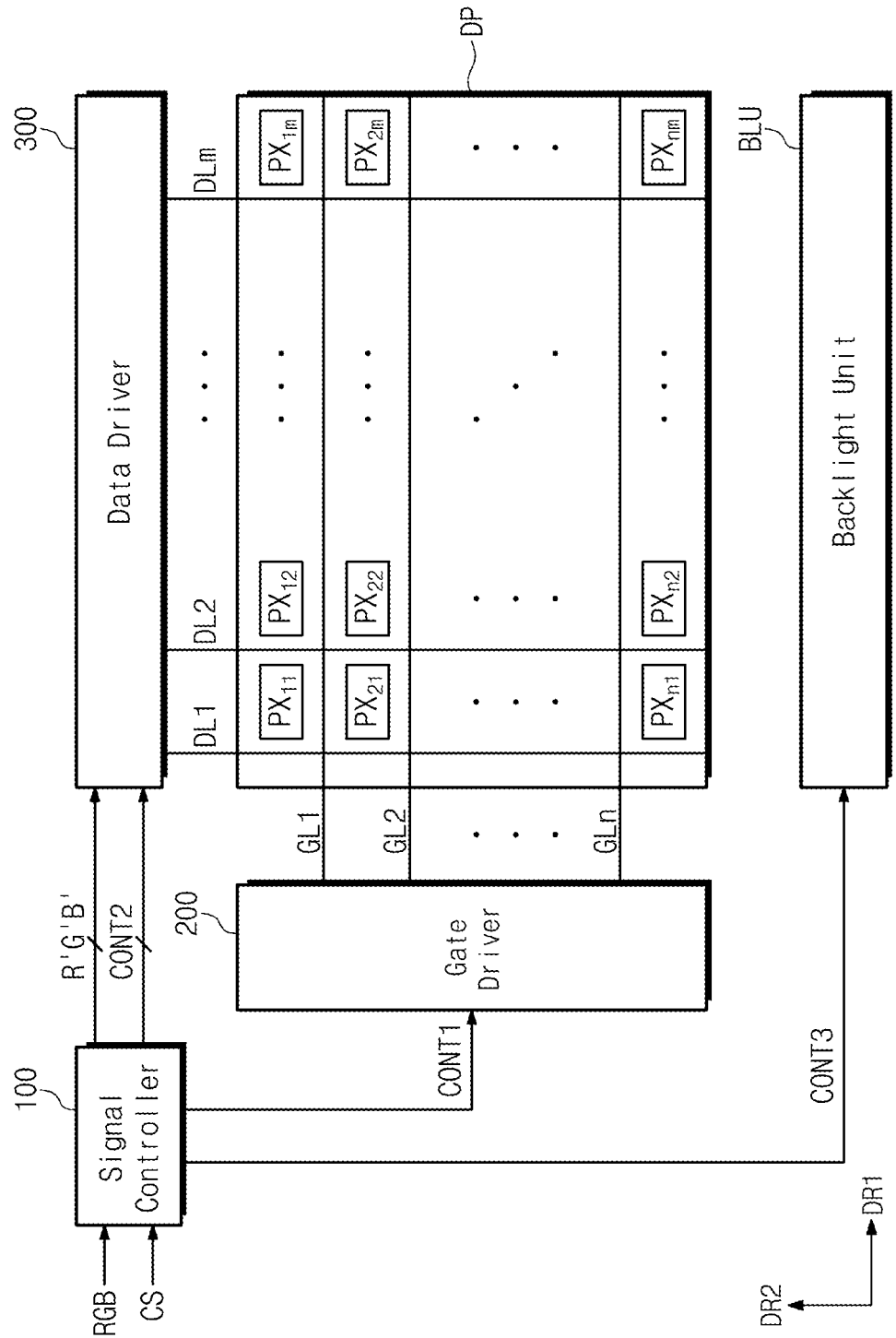
FIG. 1 is a block diagram illustrating a liquid crystal display device according to an embodiment of the present invention.

In this application, when an element or layer is referred to as being "on", "connected to", or "coupled to" another element or layer, it can be directly on, directly connected, or directly coupled to the other element or layer, or one or more intervening elements or layers may be present. When an element is referred to as being "directly on", "directly connected to", or "directly coupled to" another element or layer, there are no intended intervening elements or layers (except unintended environmental elements such as air) present. Like numbers may refer to like elements. The term "and/or" may indicate any and all combinations of one or more of the associated items.

It will be understood that, although the terms "first", "second", etc. may be used herein to describe various elements (e.g., components, regions, layers, and/or sections) these elements should not be limited by these terms. These terms are used to distinguish one element from another element. Thus, a first element could be termed a second element without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively.

Spatially relative terms, such as "beneath", "below", "lower", "above", "upper", and the like, may be used herein for ease of description to describe one element or feature's spatial relationship to another element(s) or feature(s) as illustrated in the figures. It will be understood that the spatially relative terms may encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein should be interpreted accordingly.

The terminology used herein is for the purpose of describing particular embodiments and is not intended to limit the invention. As used herein, the singular forms, "a", "an", and "the" may indicate plural forms as well, unless the context clearly indicates otherwise. The terms "includes" and/or "including", when used in this specification, may specify the presence of stated features, integers, steps, operations, elements, and/or components, but may not preclude the presence or addition of one or more other features, integers, steps, operations, elements, components, and/or groups.

Unless otherwise defined, terms (including technical and scientific terms) used herein have the same meanings as commonly understood by one of ordinary skill in the art related to this invention. Terms, such as those defined in commonly used dictionaries, should be interpreted as having meanings that are consistent with their meanings in the context of the relevant art and should not be interpreted in an idealized or overly formal sense unless expressly so defined herein.

The term "connect" may mean "electrically connect". The term "insulate" may mean "electrically insulate".

Figure 2:
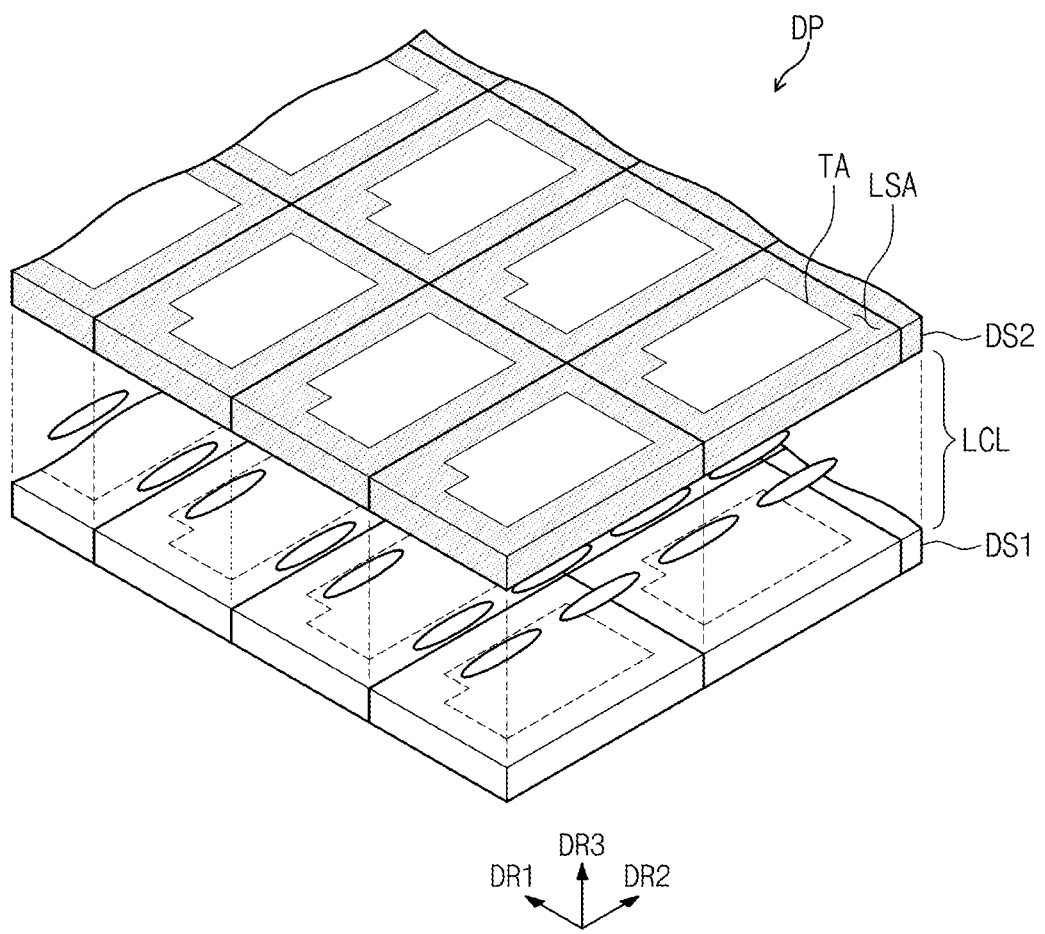
FIG. 2 is a perspective view illustrating a portion of a liquid crystal display panel of a liquid crystal display device (e.g., the liquid crystal display device illustrated in FIG. 1) according to an embodiment of the present invention.

FIG. 1 is a block diagram illustrating a liquid crystal display device according to an embodiment of the present invention. FIG. 2 is a perspective view illustrating a portion of a liquid crystal display panel DP of the liquid crystal display device illustrated in FIG. 1 according to an embodiment of the present invention.

Referring to FIG. 1, the liquid crystal display device includes the liquid crystal display panel DP, a signal controller 100, a gate driver 200, a data driver 300, a backlight unit BLU, and two polarizers (not shown).

The liquid crystal display panel DP includes a plurality of signal lines and a plurality of pixels PX11 to PXnm connected to the signal lines. The signal lines may include a plurality of gate lines GL1 to GLn and a plurality of data lines DL1 to DLm. The gate lines GL1 to GLn extend in a first direction DR1 and are arranged in a second direction DR2. The data lines DL1 to DLm are insulated from the gate lines GL1 to GLn while crossing the gate lines GL1 to GLn. Although not shown in figures, the signal lines may further include a plurality of common lines disposed to respectively correspond to the gate lines GL1 to GLn.

The pixels PX11 to PXnm are arranged in a matrix form (or rectangular array). Each of the pixels PX11 to PXnm is connected to a corresponding gate line of the gate lines GL1 to GLn and a corresponding data line of the data lines DL1 to DLm.

The liquid crystal display panel DP may be, for example, a vertical alignment (VA) mode display panel, a patterned vertical alignment (PVA) mode display panel, an in-plane switching (IPA) mode display panel, a fringe-field switching (FFS) mode display panel, a plane to line switching (PLS) mode display panel, or a display panel of a different mode.

The signal controller 100 may receive input image signals RGB and may convert the input image signals RGB to image data R'G'B' suitable for an operation of the liquid crystal display panel DP. The signal controller 100 may receive various control signals CS, such as one or more of a vertical synchronization signal, a horizontal synchronization signal, a main clock signal, a data enable signal, etc., and may output a first control signal CONT1 and a second control signal CONT2. The signal controller 100 may output a third control signal CONT3 to control the backlight unit BLU. The third control signal CONT3 may include a dimming signal.

The gate driver 200 may apply gate signals to the gate lines GL1 to GLn in response to the first control signal CONT1. The first control signal CONT1 may include a vertical start signal for starting an operation of the gate driver 200, a gate clock signal for determining an output timing of the gate voltage, and an output enable signal for determining an on-pulse width of the gate voltage.

The data driver 300 may receive the second control signal CONT2 and the image data R'G'B'. The data driver 300 may convert the image data R'G'B' to data voltages and may apply the data voltages to the data lines DL1 to DLm.

The second control signal CONT2 may include a horizontal start signal for starting an operation of the data driver 300, an inverting signal for inverting a polarity of the data voltages, and an output indicating signal for determining an output timing of the data voltages from the data driver 300.

The backlight unit BLU may provide a light to the liquid crystal display panel DP in response to the third control signal CONT3. The backlight unit BLU includes a light emitting device configured to emit the light. The backlight unit BLU may be a direct-illumination type or an edge-illumination type. The edge-illumination type backlight unit may include a light guide member; the direct-illumination type backlight unit may not include a light guide member. Each of the edge-illumination type backlight unit and the direct-illumination type backlight unit may include an optical film.

As illustrated in FIG. 2, the liquid crystal display panel DP includes a first display substrate DS1 and a second display substrate DS2. The first display substrate DS1 and the second display substrate DS2 are spaced apart from each other in a thickness direction DR3 (hereinafter referred to as third direction). The liquid crystal layer LCL is disposed between the display substrates DS1 and DS2.

The liquid crystal display panel DP includes a plurality of transmitting areas TA and a light blocking area LSA disposed adjacent to the transmitting areas TA. The transmitting areas TA may transmit a first portion of the light generated by the backlight unit BLU, and the light blocking area LSA may block a second portion of the light generated by the backlight unit BLU.

The light blocking area LSA and the transmitting areas TA are defined by a black matrix (not shown) included in the liquid crystal display panel DP. The light blocking area LSA corresponds to an area in which the black matrix is disposed, and the transmitting areas TA correspond to areas in which the black matrix is not disposed.

The gate lines GL1 to GLn and the data lines DL1 to DLm, which are illustrated in FIG. 1, are disposed on the first display substrate DS1 or the second display substrate DS2. The gate lines GL1 to GLn and the data lines DL1 to DLm are disposed to overlap the light blocking area LSA. Pixel electrodes of the pixels PX11 to PXnm overlap the transmitting areas TA.

Figure 3:
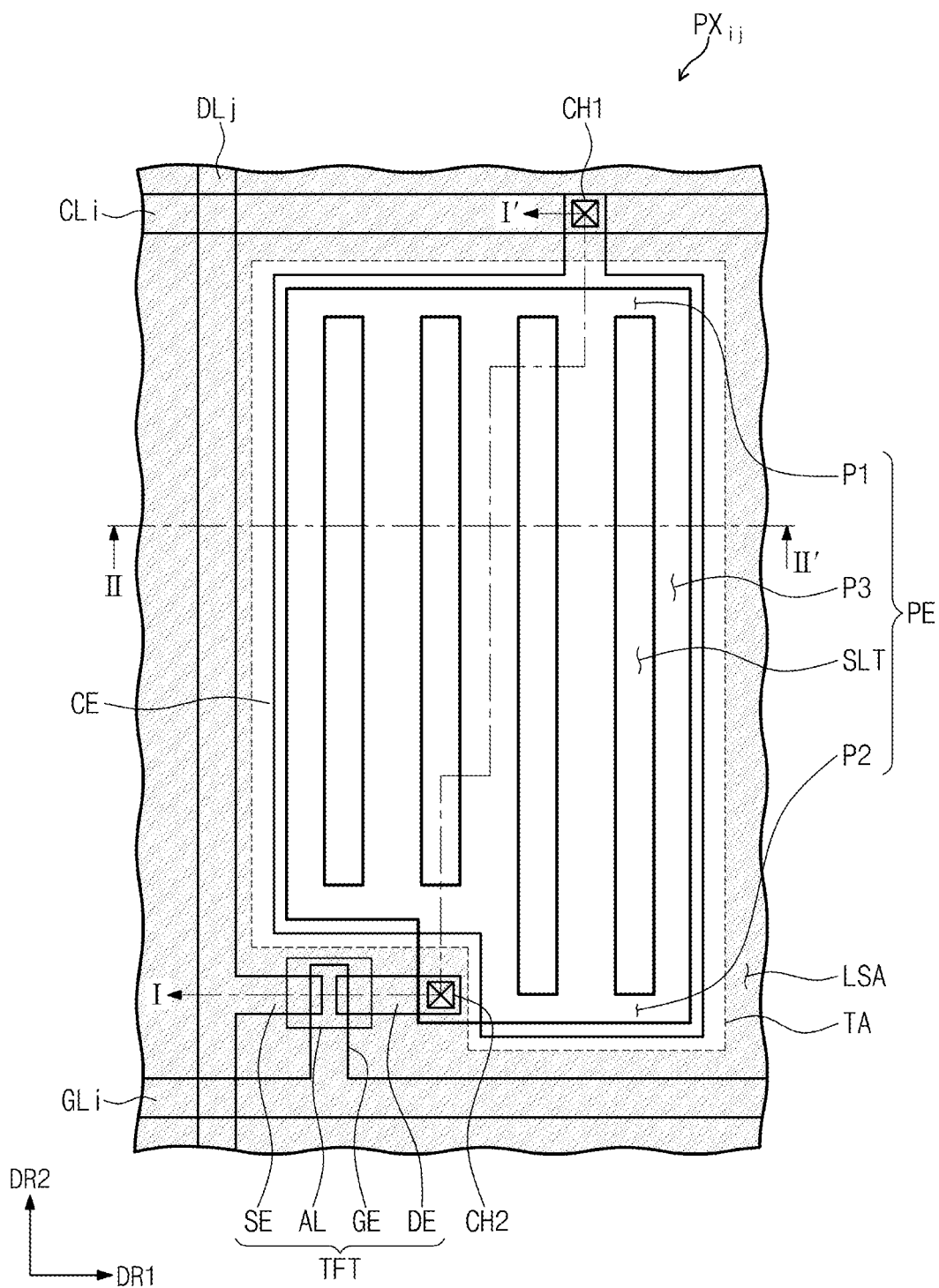
FIG. 3 is a plan view illustrating a pixel of a liquid crystal display panel according to an embodiment of the present invention.
Figure 4A:
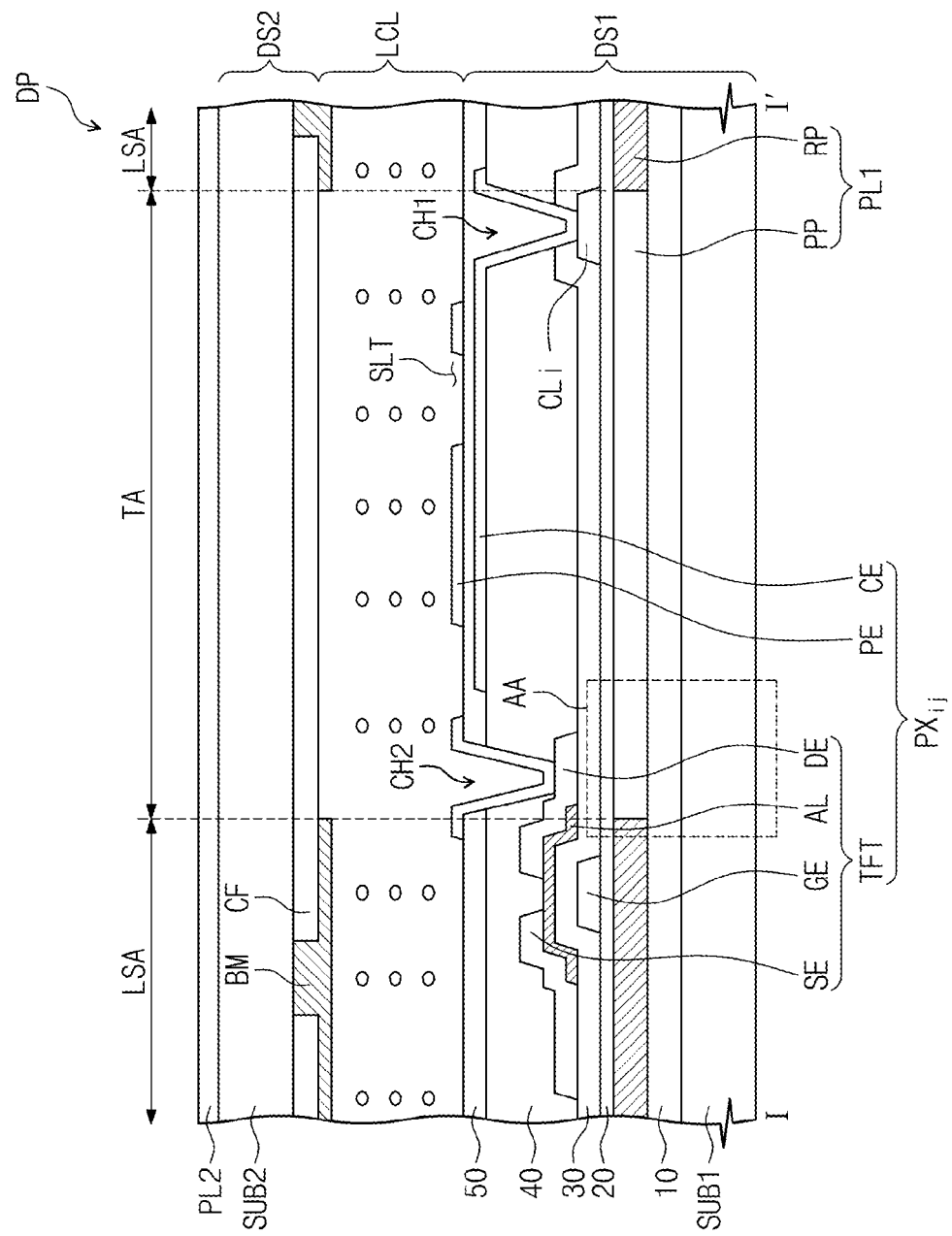
FIGS. 4A and 4B are cross-sectional views illustrating a liquid crystal display panel according to an embodiment of the present invention.
Figure 4B:
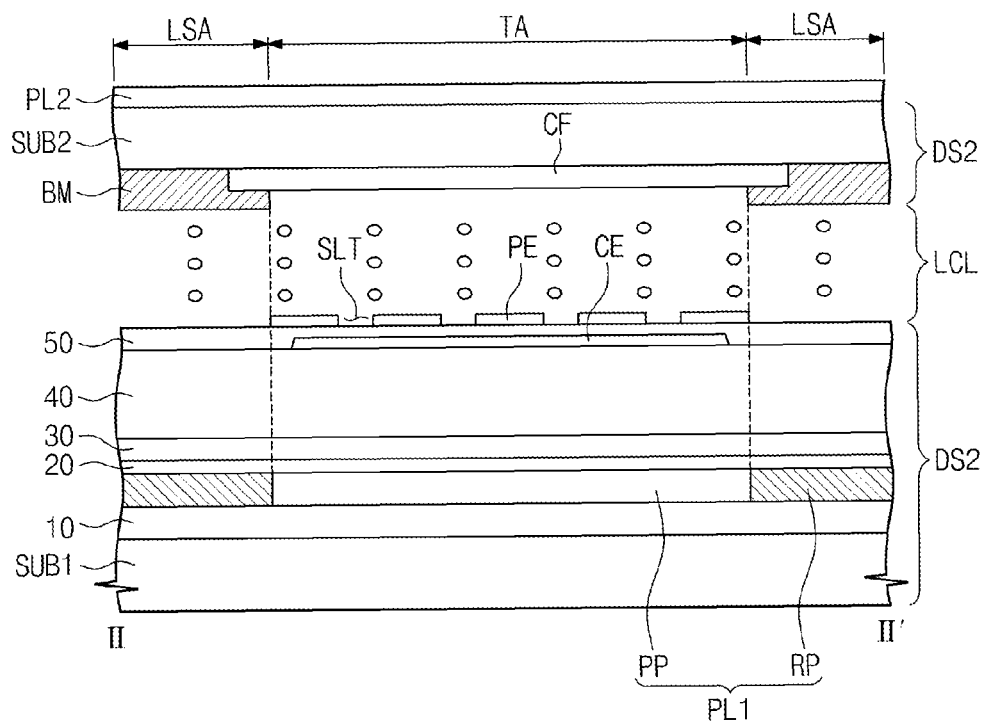

FIG. 3 is a plan view illustrating a pixel of the liquid crystal display panel DP according to an embodiment of the present invention. FIGS. 4A and 4B are cross-sectional views illustrating the liquid crystal display panel DP according to an embodiment of the present invention. In an embodiment, referring to FIG. 3, the pixel PXij may operate in the PLS mode. In an embodiment, the pixel PXij may operate in a different mode. FIG. 4A illustrates a cross-sectional view taken along a line I-I' indicated in FIG. 3. FIG. 4B illustrates a cross-sectional view taken along a line II-II' indicated in FIG. 3. Although not shown in figures, the backlight unit BLU may be disposed under the first display substrate DS1.

Referring to FIGS. 3, 4A, and 4B, the first display substrate DS1 includes a base substrate SUB1, a gate line GLi, a data line DLj, a common line CLi, and a plurality of insulating layers 10, 20, 30, 40, and 50. The second display substrate DS2 includes a second base substrate SUB2, a black matrix BM, and a color filter CF. In an embodiment, the black matrix BM and the color filter CF may be disposed on the first base substrate SUB1.

The pixel PXij is disposed between the first base substrate SUB1 and the second base substrate SUB2. The pixel PXij includes a thin film transistor TFT, a common electrode CE, and a pixel electrode PE. In an embodiment, the pixel PXij may operate in the PLS mode and may be disposed on the first base substrate SUB1. In an embodiment, the pixel PXij may operate in one or more of other modes, and the common electrode CE may be disposed on the second base substrate SUB2.

The common electrode CE and the pixel electrode PE may overlap the transmitting area TA of the first base substrate SUB1 and the thin film transistor TFT is overlapped with the light blocking area LSA of the first base substrate SUB1. The transmitting areas TA and the light blocking area LSA defined in the liquid crystal display panel DP may be analogously applied to the base substrates SUB1 and SUB2.

A first polarizer PL1 and a second polarizer PL2 are spaced apart from each other, and the pixel PXij is disposed between the first polarizer PL1 and a second polarizer PL2. At least one of the first and second polarizers PL1 and PL2 may include a plurality of patterned polarizing parts. The polarizing parts may be disposed to correspond to a portion of the pixels PX11 to PXnm (refer to FIG. 1).

The first polarizer PL1 may be disposed closer to the backlight unit BLU than the second polarizer PL2 and may include a polarization part PP and a reflection part RP. The reflection part RP may overlap the light blocking area LSA and/or the black matrix BM. The reflection part RP may not substantially absorb the light provided from the backlight unit BLU and may substantially reflect the light provided from the backlight unit BLU.

The reflection part RP is disposed at a boundary between transmitting areas TA in a plan view of the liquid crystal display panel DP. The reflection part RP may have the same shape as that of the black matrix BM in a plan view. In an embodiment, the functions of the black matrix BM may be served by the reflection part RP. Therefore, in an embodiment, the black matrix BM may be omitted. In an embodiment, the light blocking area LSA may correspond to an area in which the reflection part RP is disposed, and the transmitting areas TA may correspond to areas in which the reflection part RP is not disposed.

The polarization part PP may overlap the transmitting areas TA. The polarization part PP may include lyotropic chromonic liquid crystal dye molecules (hereinafter, referred to as dye molecules) aligned in a predetermined direction. An optical axis of the polarization part PP is determined depending on the alignment direction of the dye molecules.

The second polarizer PL2 has an optical axis substantially in parallel to or vertical to that of the first polarizer PL1. The second polarizer PL2 includes dye molecules aligned (or oriented) in a predetermined direction. In an embodiment, the second polarizer PL2 may be a stretched-element polarizing film, which may include stretched elements, e.g., stretched polymers. The stretched-element polarizing film may include a polyvinyl alcohol-based polarizing film, an iodine-based compound or a dichroic polarizing material that is adhered to the polyvinyl alcohol-based polarizing film, and a triacetylcellulose protective film configured to protect the polyvinyl alcohol-based polarizing film.

The first polarizer PL1, the gate line GLi, the data line DLj, the common line CLi, and the insulating layers 10 to 50 are disposed on the first base substrate SUB1.

The first base substrate SUB1 may be a transparent substrate, such as one of a glass substrate, a plastic substrate, a silicon substrate, etc. A first insulating layer 10 is disposed on the first base substrate SUB1. The first insulating layer 10 may be a buffer layer for minimizing contamination of the thin film transistor TFT and may be used to enhance a coupling force between layers formed after the first insulating layer 10. The first insulating layer 10 includes an organic or inorganic material. The first insulating layer 10 may have a multi-layer structure. The first insulating layer 10 may include a silicon inorganic material. The silicon inorganic material may include at least one of silicon oxide and silicon nitride.

The first polarizer PL1 is disposed on the first insulating layer 10. In an embodiment, as illustrated in FIGS. 4A and 4B, the reflection part RP and the polarization part PP may have the same thickness. In an embodiment, a thickness of the reflection part RP may be unequal to a thickness of the polarization part PP. The polarization part PP may partially overlap the reflection part RP in the light blocking area LSA. According to an embodiment, the first polarizer PL1 is disposed on a rear surface of the first base substrate SUB1, such that the first base substrate SUB1 is disposed between the first polarizer PL1 and the first insulating layer 10.

A second insulating layer 20 may be disposed on the first polarizer PL1. The second insulating layer 20 may protect the first polarizer PL1 and may insulate the reflection part PR from the thin film transistor TFT. The second insulating layer 20 may provide a flat surface over the first polarizer PL1.

The gate line GLi and the common line CLi are disposed on the second insulating layer 20. A control electrode GE of the thin film transistor TFT is branched from the gate line GLi. The control electrode GE is formed of the same material as the gate line GLi and has the same layer structure as the gate line GLi. The control electrode GE and the gate line GLi may include copper (Cu), aluminum (Al), or an alloy that includes copper and/or aluminum. The control electrode GE and the gate line GLi may have a multi-layer structure that includes an aluminum layer and one or more other metal layers.

A third insulating layer 30 is disposed on the second insulating layer 20 to cover the gate line GLi and the common line CLi. The third insulating layer 30 may include an inorganic material and may have a multi-layer structure.

A semiconductor layer AL is disposed on the third insulating layer 30 and overlaps the control electrode GE. An ohmic contact layer (not shown) may be disposed on the third insulating layer 30. The data line DLj is disposed on the third insulating layer 30.

The data line DLj may include copper (Cu), aluminum (Al), or an alloy that includes copper and/or aluminum. The data line DLj may have a multi-layer structure that includes an aluminum layer and one or more other metal layers, e.g., a chromium layer and/or a molybdenum layer. An input electrode (or source electrode) SE of the thin film transistor TFT is branched from the data line DLj. The input electrode SE may include the same material as the data line DLj and may have the same layer structure as the data line DLj.

An output electrode DE is disposed on the third insulating layer 30 and is spaced apart from the input electrode SE. Each of the input electrode SE and the output electrode DE overlap the semiconductor layer AL.

A fourth insulating layer 40 is disposed on the third insulating layer 30 to cover the input electrode SE, the output electrode DE, and the data line DLj. The fourth insulating layer 40 may provide a flat surface. The fourth insulating layer 40 may include an organic material.

The common electrode CE is disposed on the fourth insulating layer 40. The common electrode CE is connected to the common line CLi through a first contact hole CH1 formed through the third insulating layer 30 and the fourth insulating layer 40. In an embodiment, the common electrode CE may be disposed on the second base substrate SUB2, in accordance with the operation mode of the pixel PXij.

A fifth insulating layer 50 is disposed on the fourth insulating layer 40 to cover the common electrode CE. The pixel electrode PE is disposed on the fifth insulating layer 50 and overlaps the common electrode CE. The pixel electrode PE is connected to the output electrode DE through a second contact hole CH2 formed through the fourth insulating layer 40 and the fifth insulating layer 50. A protective layer (not shown) may be disposed on the fifth insulating layer 50 to protect the pixel electrode PE. An alignment layer (not shown) may be disposed on the protective layer and/or the fifth insulating layer 50 for aligning liquid crystal molecules.

The pixel electrode PE may have a plurality of slits SLT. The pixel electrode PE includes a first horizontal portion P1, a second horizontal portion P2 spaced apart from the first horizontal portion P1, and a plurality of vertical portions P3 configured to connect the first horizontal portion P1 and the second horizontal portion P2. The slits SLT are disposed between the vertical portions P3. In an embodiment, the pixel electrode PE may have one or more of other shapes and/or structures.

The thin film transistor TFT may output the data voltage applied to the data line DLj in response to the gate signal applied to the gate line GLi. The common electrode CE may receive the common voltage, and the pixel electrode PE may receive the data voltage. The common electrode CE and the pixel electrode PE may form a lateral electric field. The lateral electric field may orient (and/or align) liquid crystal molecules of the liquid crystal layer LCL.

The second display substrate DS2 is disposed above and/or overlaps the first display substrate DS1. The second base substrate SUB2 may be a transparent substrate, e.g., one of a glass substrate, a plastic substrate, a silicon substrate, etc. According to an embodiment, the first display substrate DS1 may be disposed above the second display device DS2.

The color filter CF may overlap at least the transmitting area TA. The color filter CF may completely cover the transmitting area TA and may partially overlap the light blocking area LSA. The color filter CF may include at least one of red, green, and blue color filters. In an embodiment, as illustrated in FIG. 4, one color filter CF may correspond to one pixel PXij. In an embodiment, the liquid crystal display panel DP may include a plurality of color filter groups or color filters having different colors and corresponding to the pixels PX11 to PXnm.

Figure 5:
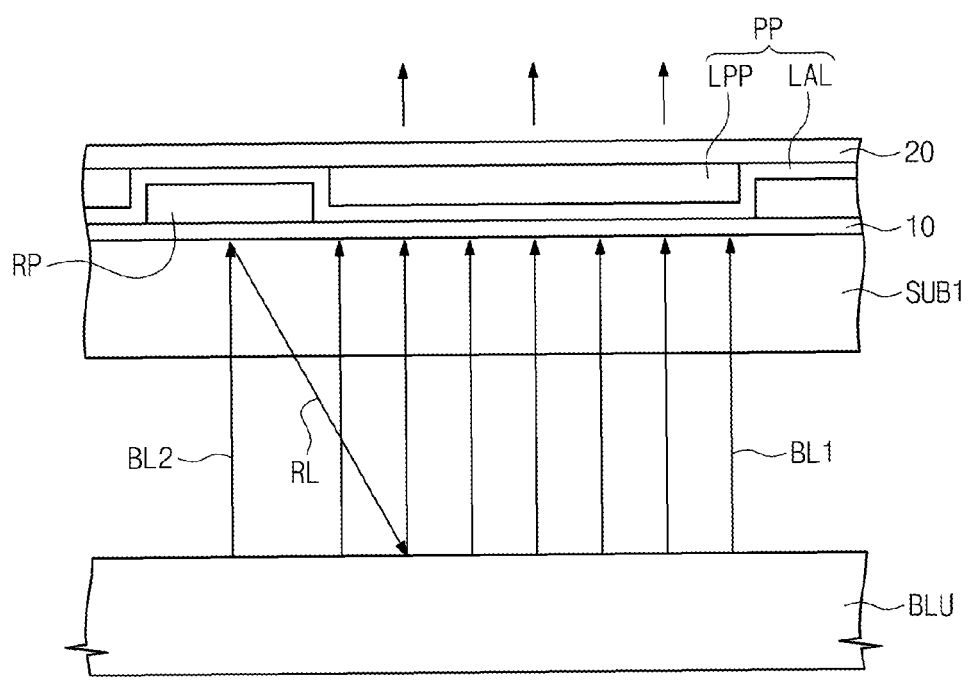
FIG. 5 is a schematic diagram (e.g., an enlarged view) illustrating a portion AA indicated in FIG. 4A.

FIG. 5 is a schematic diagram (e.g., an enlarged view) illustrating a portion AA indicated in FIG. 4A. The first polarizer PL1 is further described with reference to FIG. 5.

The reflection part RP may include a metal layer configured to reflect light provided from the backlight unit BLU. The metal layer may include aluminum (Al), copper (Cu), or an alloy that includes at least one of Al and Cu.

The polarization part PP may include a light alignment layer LAL and a polarization pattern LPP. The light alignment layer LAL may be disposed in both the transmitting area TA and the light blocking area LSA. A portion of the light alignment layer LAL may be disposed at the boundary of the transmitting area TA and the light blocking area LSA. The light alignment layer LAL includes a polymer, such as one or more of azobenzene, coumarin, chalcone, cinnamate, etc., that contains a light functional group.

The polarization pattern LPP may include dye molecules that are aligned substantially parallel to a molecular axis of the functional group. The dye molecules may include bis-(N,N diethylaminoethyl)perylene-3,4,9,10-tetracarboxylic diimide (PDI-DEAE). The polarization pattern LPP may absorb a portion of incident light that is substantially in parallel to the alignment direction of the dye molecules and may transmit a portion of the incident light that is substantially vertical to the alignment direction of the dye molecules.

According to an embodiment, the light alignment layer LAL may be omitted. In an embodiment, one or more of various coating methods may be performed in order to align the dye molecules included in the polarization pattern LPP.

Among the light BL1 and BL2 generated from the backlight unit BLU, a portion of the light BL1 incident to the polarization pattern LPP is provided to the liquid crystal layer LCL (refer to FIGS. 4A and 4B) after the light BL1 has been polarized by the polarization pattern LPP. Among the light BL1 and BL2 generated from the backlight unit BLU, the light BL2 is incident to the reflection part RP.

The light BL2 incident to the reflection part RP is reflected and scattered toward the backlight unit BLU. The reflected and scattered light RL toward the backlight unit BLU is re-reflected by an optical member (not shown) included in the backlight unit BLU. The re-reflected light is finally incident to the polarization pattern LPP. After polarization, a portion of the re-reflected light is incident to the liquid crystal layer LCL. Due to the above-mentioned function of the reflection part RP, the light generated from the backlight unit BLU is provided to the liquid crystal layer LCL without being absorbed by other components. As a result, light efficiency may be maximized.

FIGS. 6A to 6H are cross-sectional views illustrating a method for manufacturing a liquid crystal display panel according to an embodiment of the present invention. Each of FIGS. 6A to 6H may illustrate two transmitting areas TA adjacent to (and immediately neighboring) each other. One of the two transmitting areas TA may correspond to the transmitting area TA illustrated in FIG. 4B.

Figure 6A:
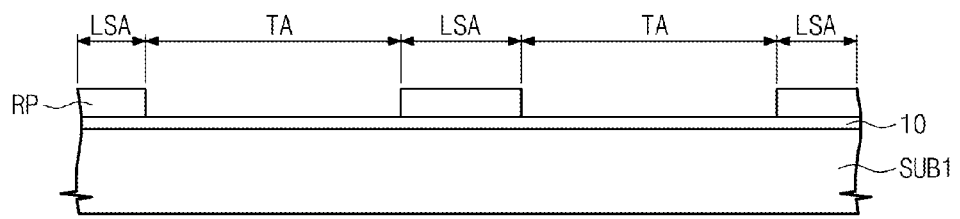
FIGS. 6A to 6H are cross-sectional views illustrating a method for manufacturing a liquid crystal display panel according to an embodiment of the present invention.

Referring to FIG. 6A, the first insulating layer 10 is formed on the first base substrate SUB1, and the reflection part RP is formed on the first insulating layer 10. The first insulating layer 10 may be formed using a coating method and/or a depositing method with a suitable material.

A metal layer is formed on the first insulating layer 10 and may be patterned through a photolithography process and/or an etching process. The patterned metal layer forms the reflection part RP. The area in which the reflection part RP is disposed may be previously defined to correspond to the light blocking area LSA.

Subsequently, referring to FIG. 6B, the light alignment layer LAL is formed on the first insulating layer 10 to cover the reflection part RP. To this end, a polymer layer containing, for example, one or more of azobenzene, coumarin, chalcone, cinnamate, etc., is formed, and a polarized light is irradiated onto the polymer layer. When the polarized light is irradiated onto the polymer layer, a photoisomerization or photocrosslinkage reaction may anisotropically occur. Thus, anisotrpic porperty is induced on the surface of the polymer layer.

Figure 6B:
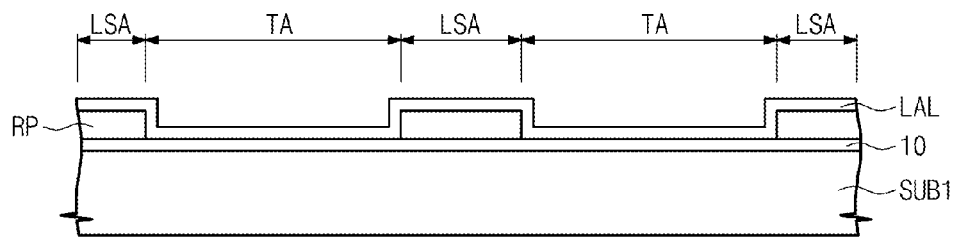
Figure 6C:
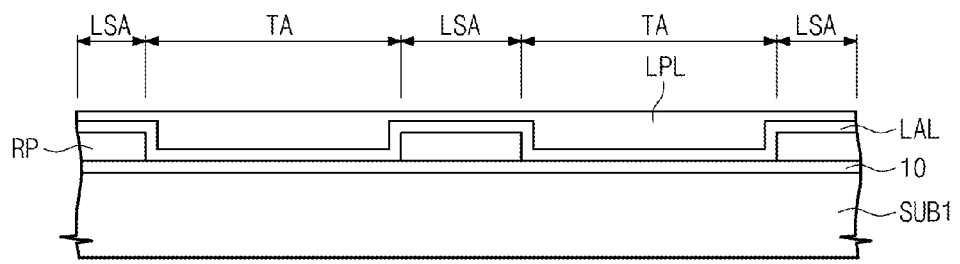

Referring to FIG. 6C, a mixture solution is coated on the light alignment layer LAL to form a coating layer LPL (or material layer LPL). The mixture solution includes dye molecules dissolved in a solvent, a light curing agent, and a crosslink agent. The dye molecules are oriented (and/or aligned) substantially parallel to the molecular axis of the light functional group (or molecular axes of molecules in the light alignment layer LAL).

The solvent may include a polar solvent, e.g., acrylic acid. The mixture solution includes the dye molecules having a concentration in a range of about 5 wt % to about 25 wt %, the light curing agent having a concentration of about 10 wt %, and the crosslink agent having a concentration in a range of about 10 wt % to about 20 wt % with respect to the solvent.

Figure 6D:
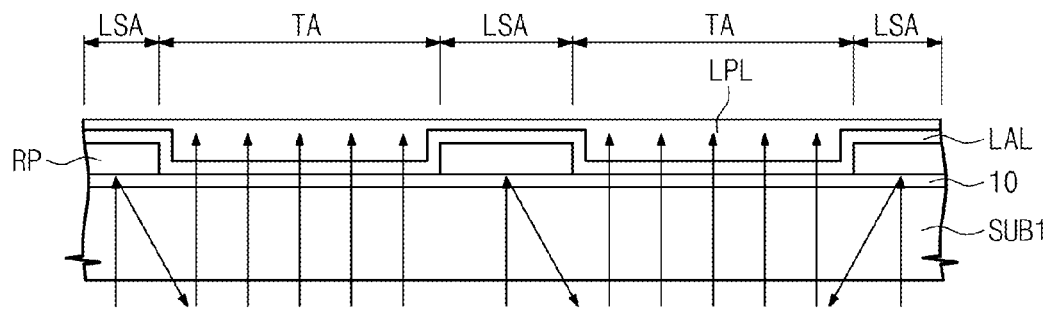

Referring to FIG. 6D, a light is irradiated to the coating layer LPL from the lower side of the first base substrate SUB1. The coating layer LPL is partially cured as a result of the irradiation of the light. A portion of the coating layer LPL that is not covered (or shielded) by the reflection part RP is cured.

Figure 6E:
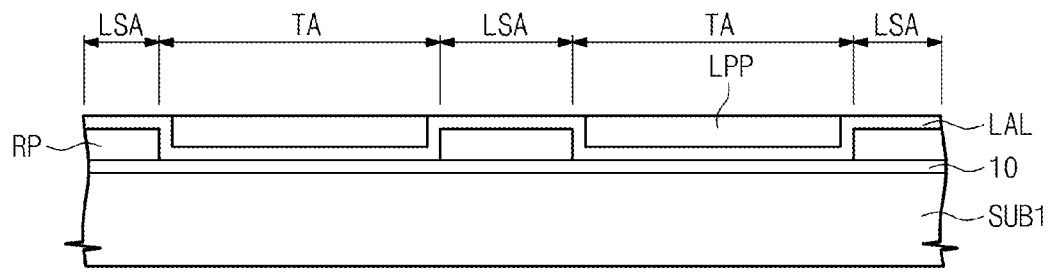

Referring to FIG. 6D and FIG. 6E, a portion of the coating layer LPL that overlaps the reflection part RP and is not cured is removed by a cleaning solution. The remaining cured portion of the coating layer LPL may form the polarization pattern LPP. In an embodiment, a surface portion of the coating layer LPL that is not sufficiently cured may be (at least partially) removed, and thus the thickness of the polarization pattern LPP may be less than the thickness of the coating layer LPL.

The reflection part RP may function as a mask in the curing process. As described above, the coating layer LPL is patterned to form the polarization pattern LPP without using an additional mask. Advantageously, the manufacturing cost of the liquid crystal display panel and/or the manufacturing time of the liquid crystal display panel DP may be minimized.

Figure 6F:
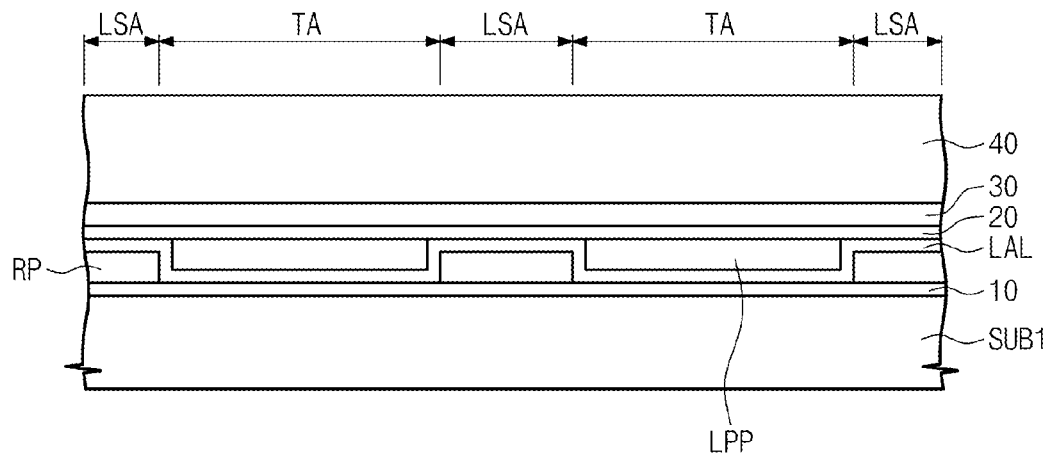

After the first polarizer PL1, which includes the reflection part RP, the light alignment layer LAL, and the polarization pattern LPP, is formed, the pixel PXij (refer to FIG. 4A) is formed on the first base substrate SUB1. As illustrated in FIG. 6F, the insulating layers 20, 30, and 40 are sequentially formed (and/or stacked) on the first polarizer PL1. Between forming (and/or stacking) the insulating layers 20, 30, and 40, a plurality of patterning processes for conductive layers (e.g., metal layers) may be performed to form conductors. The gate line GLi (refer to FIG. 3), the data line DLj (refer to FIG. 4A), and the thin film transistor TFT (refer to FIG. 3) are formed through the patterning processes performed on the conductive layers (e.g., metal layers).

Figure 6G:
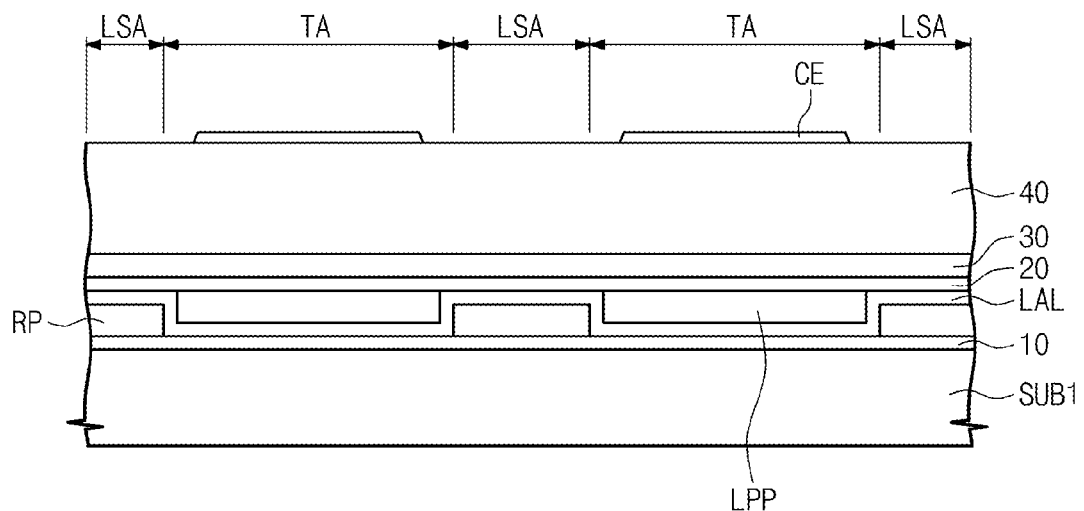
Figure 6H:
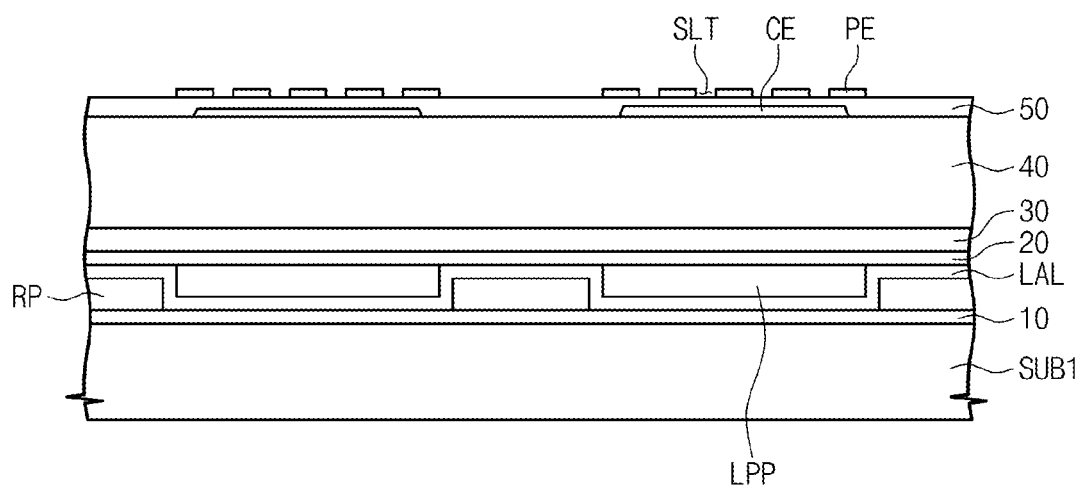

Referring to FIG. 6G and FIG. 6H, the common electrode CE is formed on the fourth insulating layer 40, and the fifth insulating layer 50 is formed on the fourth insulating layer 40 to cover the common electrode CE. Subsequently, the pixel electrode PE is formed on the fifth insulating layer 50 and is insulated from the common electrode CE. To form the common electrode CE and the pixel electrode PE, conductive layer (e.g., metal layer) patterning processes including photolithography and/or etching processes are performed.

Although not shown in figures, the second display substrate DS2 illustrated in FIGS. 4A and 4B may be formed through processes that are separated from the processes performed for forming the first display substrate DS1. The separately formed second display substrate DS2 may be subsequently coupled to the first display substrate DS1.

To form the second display substrate DS2, a patterning process is performed on an organic layer formed on the second base substrate SUB2.

After each of the first display substrate DS1 and the second display substrate DS2 has been formed, a sealant is formed at at least one edge of at least one the second display substrate DS2 and the first display substrate DS1, and the display substrates DS1 and DS2 are coupled to each other. Subsequently, a liquid crystal material is injected into a space between the display substrates DS1 and DS2.

In an embodiment, the process of forming the light alignment layer LAL illustrated in FIG. 6B may be omitted. The coating layer LPL may be formed by shear-coating the mixture solution on the first insulating layer 10 and the reflection part RP. To this end, the mixture solution is coated on the first insulating layer 10 and a shear force is applied to the mixture solution in one direction using a stick or slim bar, thereby coating the mixture solution on the first insulating layer 10. The dye molecules are aligned along the direction in which the shear force is applied. Accordingly, the optical axis of the coating layer LPL is formed.

Figure 7:
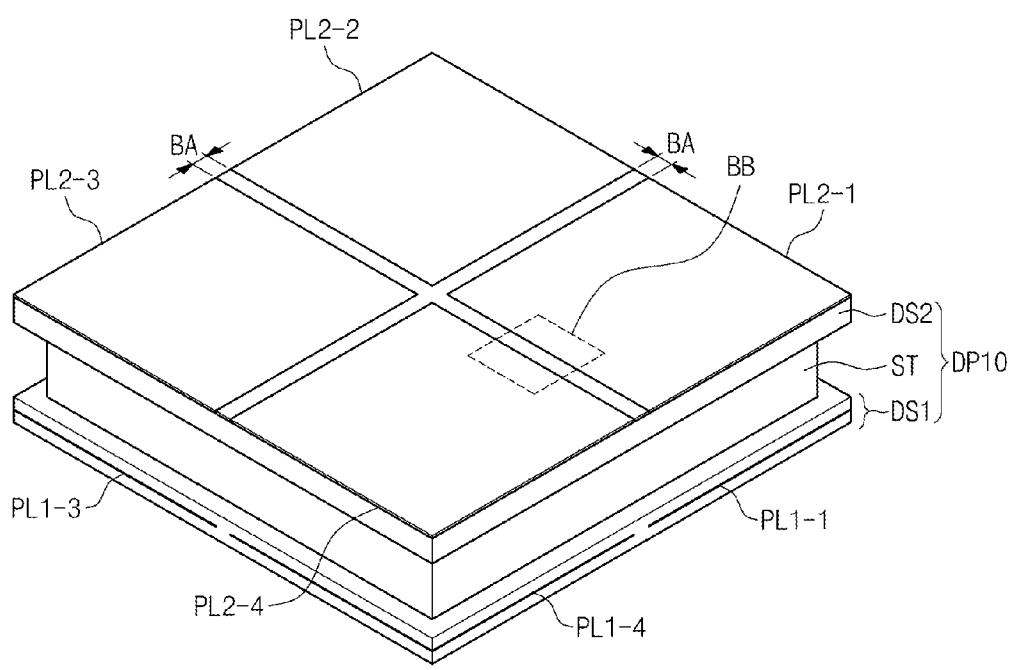
FIG. 7 is a perspective view illustrating a liquid crystal display panel according to an embodiment of the present invention.
Figure 8:
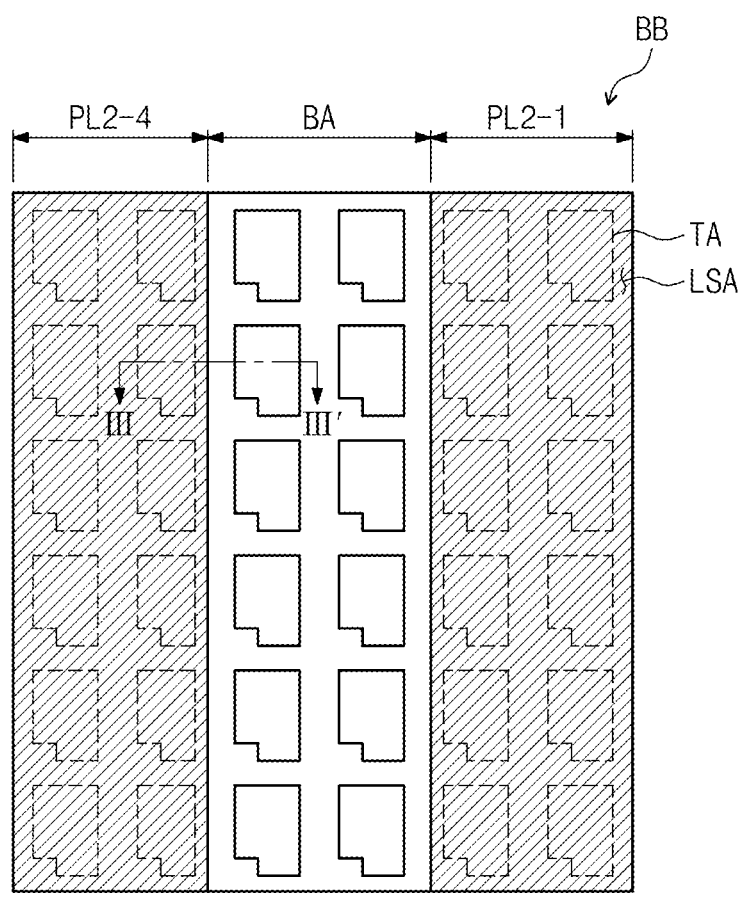
FIG. 8 is a schematic diagram (e.g., an enlarged view) illustrating a portion BB indicated in FIG. 7.
Figure 9:
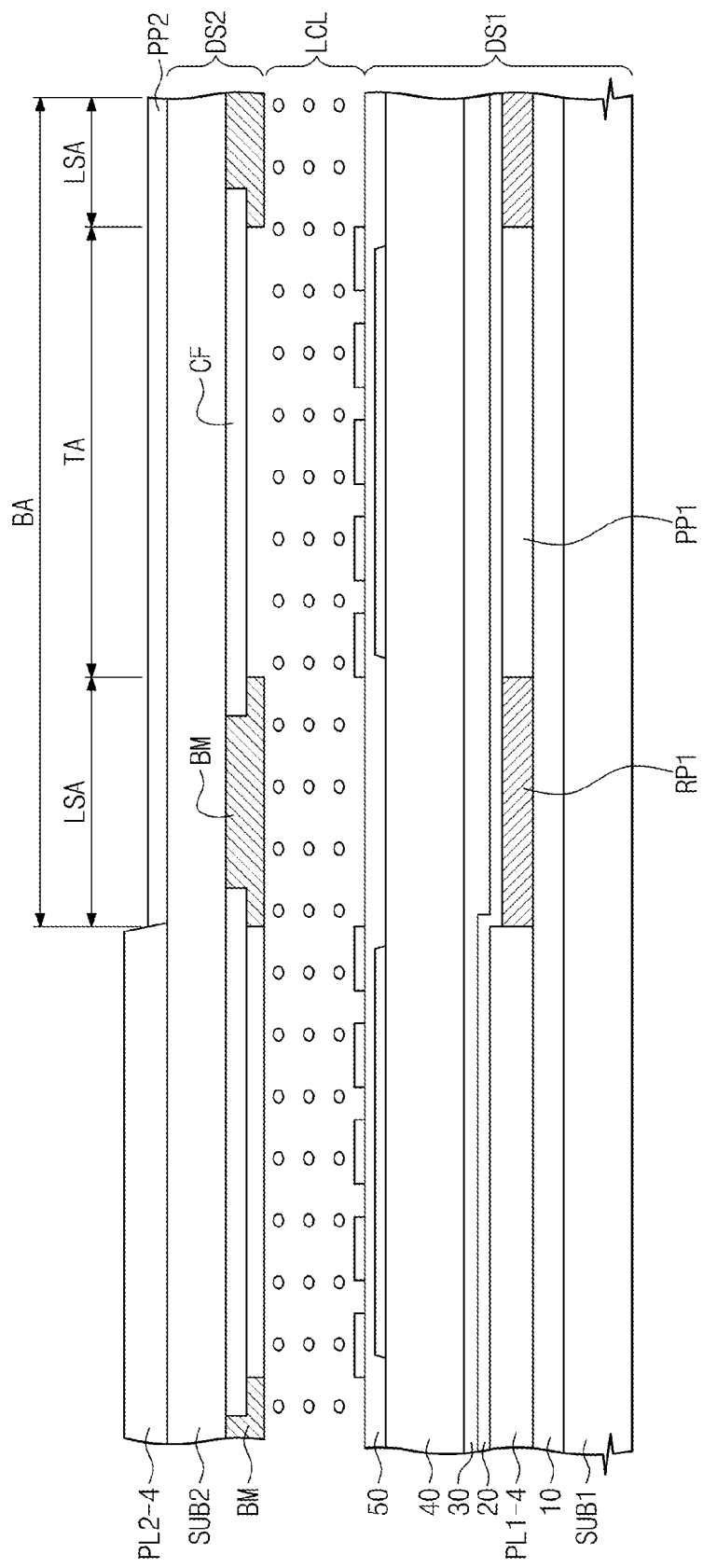
FIG. 9 is a cross-sectional view illustrating a liquid crystal display panel according to an embodiment of the present invention.

FIG. 7 is a perspective view illustrating a liquid crystal display panel DP10 according to an embodiment of the present invention. FIG. 8 is a schematic diagram (e.g., an enlarged view) illustrating a portion BB indicated in FIG. 7. FIG. 9 is a cross-sectional view illustrating the liquid crystal display panel DP10 according to an embodiment of the present invention. In an embodiment, FIG. 9 illustrates the cross-sectional view taken along a line III-III' indicated in FIG. 8. In FIGS. 7 to 9, the same reference numerals may denote elements that are identical to or analogous to elements illustrated in FIGS. 1 to 5, and detailed descriptions of identical elements and/or analogous elements may be omitted.

Referring to FIG. 7, the liquid crystal display panel DP10 includes a first display substrate DS1 and a second display substrate DS2 spaced apart from the first display substrate DS1. The first display substrate DS1 and the second display substrate DS2 are coupled to each other by a sealant ST disposed at at least one edge of at least one of the display substrates DS1 and DS2.

The liquid crystal display panel DP10 may include stretched-element polarizing films and polarizers described with reference to FIGS. 3 to 5. A first polarizer forms a portion of the first display substrate DS1. The first polarizer includes a plurality of stretched-element polarizing films PL1-1, PL1-3, PL1-4, etc. (hereinafter referred to as first-set polarizing films or first polarizing films), a plurality of polarization parts, and a reflection part.

A second polarizer may be disposed on the second display substrate DS2. The second polarizer includes a plurality of stretched-element polarizing films PL2-1, PL2-2, PL2-3, and PL2-4 (hereinafter referred to as second-set polarizing films or second polarizing films) and a plurality of polarization parts.

The second polarizing films PL2-1 to PL2-4 define a boundary area BA, which is located between the second polarizing films in a plan view of the second display substrate DS2 and/or the liquid crystal display panel DP10. The second polarizing films PL2-1 to PL2-4 are not disposed in the boundary area BA. Although not shown in figures, the first polarizing films PL1-1 to PL1-4 may define an analogous boundary area BA as the second polarizing films PL2-1 to PL2-4.

As illustrated in FIG. 8, each of the second polarizing films PL2-1 to PL2-4 may overlap a first subset of the transmitting areas TA. A second subset of the transmitting areas TA, which is in the boundary area BA, may not be covered by the second polarizing films PL2-1 to PL2-4.

Referring to FIG. 9, the second polarizer is disposed on an upper surface of the second base substrate SUB2. The second polarizer includes the second polarizing films PL2-1 to PL2-4 and a second polarization part PP2. The second polarizing films PL2-1 to PL2-4 and a second polarization part PP2 have the same optical axis direction. According to an embodiment, the second polarizer may be disposed on a lower surface of the second base substrate SUB2 and/or may be disposed between the second base substrate SUB2 and the first base substrate SUB1.

The first polarizer includes the first polarizing films PL1-1 to PL1-4, a first polarization part PP1, and a first reflection part RP1. The first polarizing films PL1-1 to PL1-4 and the first polarization part PP1 have the same optical axis direction.

Although the liquid crystal display panel DP10 may not include a large-sized stretched-element polarizing film, the liquid crystal display panel DP10 may display images with satisfactory quality. This is because the polarization parts PP1 and PP2 may supplement and/or assist the stretched-element polarizing films (PL1-1 to PL1-4 and PL2-1 to PL2-4) in the boundary area BA. Accordingly, the liquid crystal display panel DP10 may not need to include a large-sized stretched-element polarizing film. Advantageously, the manufacturing cost of the liquid crystal display panel DP10 may be minimized.

According to an embodiment, the second polarizer may be one large-sized stretched-element polarizing film. In an embodiment, the second polarizer may be a polarization part that does not include a reflection part. In an embodiment, the second polarizer may be formed using a coating layer LPL (refer to FIG. 6C) formed by a mixture solution discussed with reference to FIG. 6C and may be disposed on the second display substrate.

Although embodiments of the present invention have been described, it is understood that the present invention should not be limited to these embodiments. Various changes and modifications can be made by one ordinary skilled in the art within the spirit and scope of the present invention hereinafter claimed.

What is claimed is:

1. A liquid crystal display panel comprising:
    a first base substrate that includes a transmitting area and a light blocking area disposed adjacent to the transmitting area;
    a second base substrate disposed spaced apart from the first base substrate;
    a pixel disposed between the first base substrate and the second base substrate; and
    a first polarizer and a second polarizer spaced from each other, wherein the pixel is disposed between the first polarizer and the second polarizer,
    wherein the first polarizer comprises a reflection part,
    wherein the polarization part comprises a light alignment layer disposed on the surface of the first base substrate and comprising a polarizing pattern disposed on the light alignment layer,
    wherein the reflection part overlaps the light blocking area in a direction perpendicular to a side of the first base substrate, and wherein the polarizing pattern overlaps the transmitting area and does not overlap the reflection part in the direction perpendicular to the side of the first base substrate.

2. The liquid crystal display panel of claim 1, wherein the first polarizer receives a light provided from a backlight unit earlier than the second polarizer.

3. The liquid crystal display panel of claim 2, wherein the first polarizer is disposed between a surface of the first base substrate and the pixel.

4. The liquid crystal display panel of claim 3, wherein the reflection part comprises a metal layer disposed on the surface of the first base substrate.

5. The liquid crystal display panel of claim 3, wherein the polarizing pattern including lyotropic chromonic liquid crystal dye molecules aligned by the light alignment layer.

6. The liquid crystal display panel of claim 5, wherein the lyotropic chromonic liquid crystal dye molecules comprise bis-(N,N diethylaminoethyl)perylene-3,4,9,10-tetracarboxylic diimide (PDI-DEAE).

7. The liquid crystal display panel of claim 3, wherein the pixel comprises:
  a thin film transistor connected to a gate line and a data line; and
  a pixel electrode connected to the thin film transistor,
  wherein the gate line is disposed on the first polarizer and insulated from the reflection part and the data line is insulated from the gate line.

8. The liquid crystal display panel of claim 7, wherein the pixel electrode is overlapped with the polarization part and the thin film transistor is overlapped with the reflection part.

9. The liquid crystal display panel of claim 1, wherein the second polarizer is a stretched-element polarizing film.

10. The liquid crystal display panel of claim 1, further comprising:
  a black matrix overlapped with the light blocking area; and
  a color filter overlapped with the transmitting area.

11. A liquid crystal display device comprising:
  a liquid crystal display panel that includes a first base substrate, a second base substrate disposed spaced apart from the first base substrate, and a plurality of pixels disposed between the first base substrate and the second base substrate, the liquid crystal display panel including a plurality of transmitting areas and a light blocking area disposed adjacent to the transmitting areas when viewed in a plan view;
  a backlight unit that provides a light to the liquid crystal display panel; and
  first and second polarizers disposed spaced apart from each other such that the pixels are disposed between the first and second polarizers, the first polarizer comprising:
  a plurality of stretched-element polarizing films each of which is overlapped with a portion of the transmitting areas;
  a plurality of polarization parts overlapped with the other portion of the transmitting areas, which is not overlapped with the polarizing films, and containing lyotropic chromonic liquid crystal dye molecules aligned in a predetermined direction; and
  a reflection part overlapped with a portion of the light blocking area, which is disposed adjacent to the transmitting areas not overlapped with the polarizing films.

12. The liquid crystal display device of claim 11, wherein the stretched-element polarizing films have an optical axis in the same direction as an optical direction of the polarization part.

13. The liquid crystal display device of claim 12, wherein the first polarizer is disposed closer to the backlight unit than the second polarizer.

14. The liquid crystal display device of claim 13, wherein the reflection part comprises a metal layer disposed on a surface of the first base substrate.

15. The liquid crystal display device of claim 13, wherein the polarization part further comprises an alignment layer disposed on the surface of the first base substrate to align the lyotropic chromonic liquid crystal dye molecules.

16. The liquid crystal display device of claim 13, wherein the lyotropic chromonic liquid crystal dye molecules comprise bis-(N,N diethylaminoethyl)perylene-3,4,9,10-tetracarboxylic diimide (PDI-DEAE).

* * * * *